March 2, 1926.  
R. W. JOHNSON  
SHAPING MECHANISM  
Filed August 6, 1923  
1,575,367  
3 Sheets-Sheet 1
Fig:1.
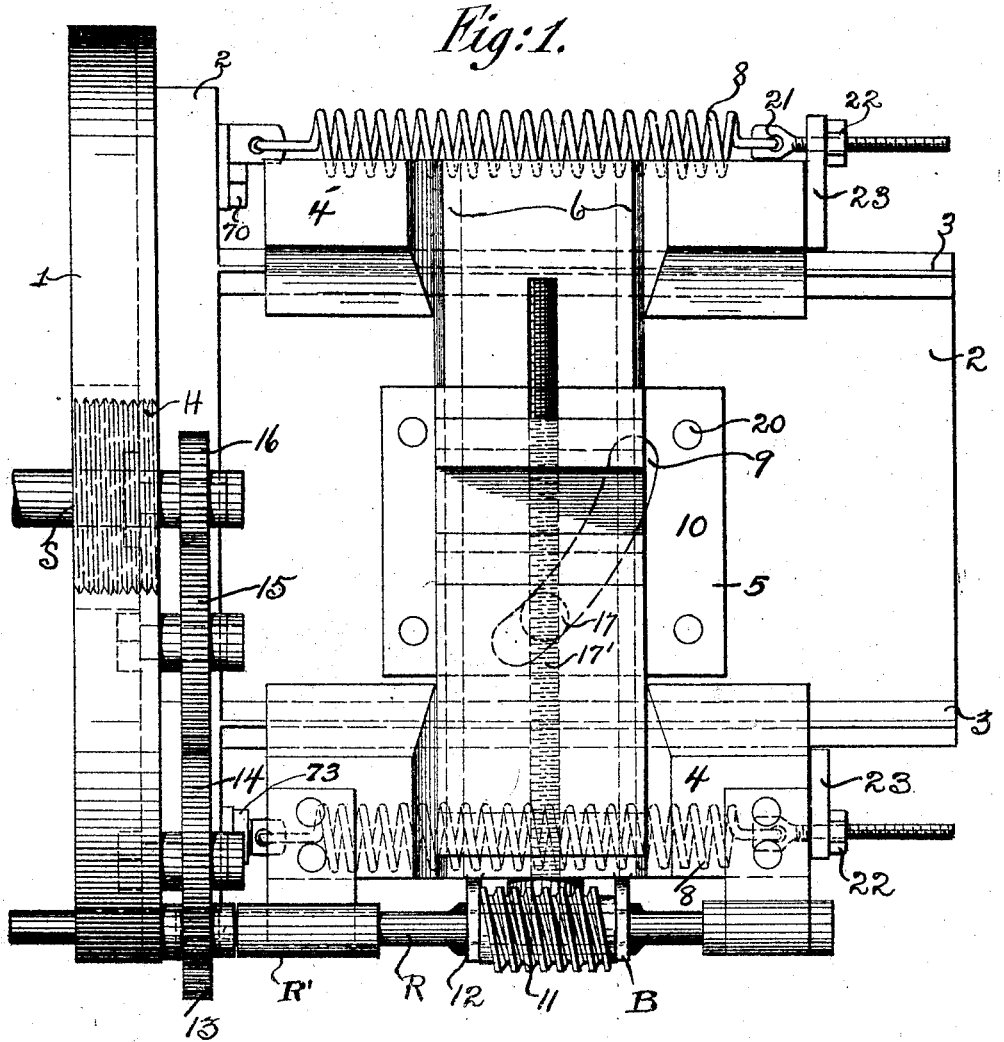
Inventor  
Roy Walter Johnson  
By his Attorneys

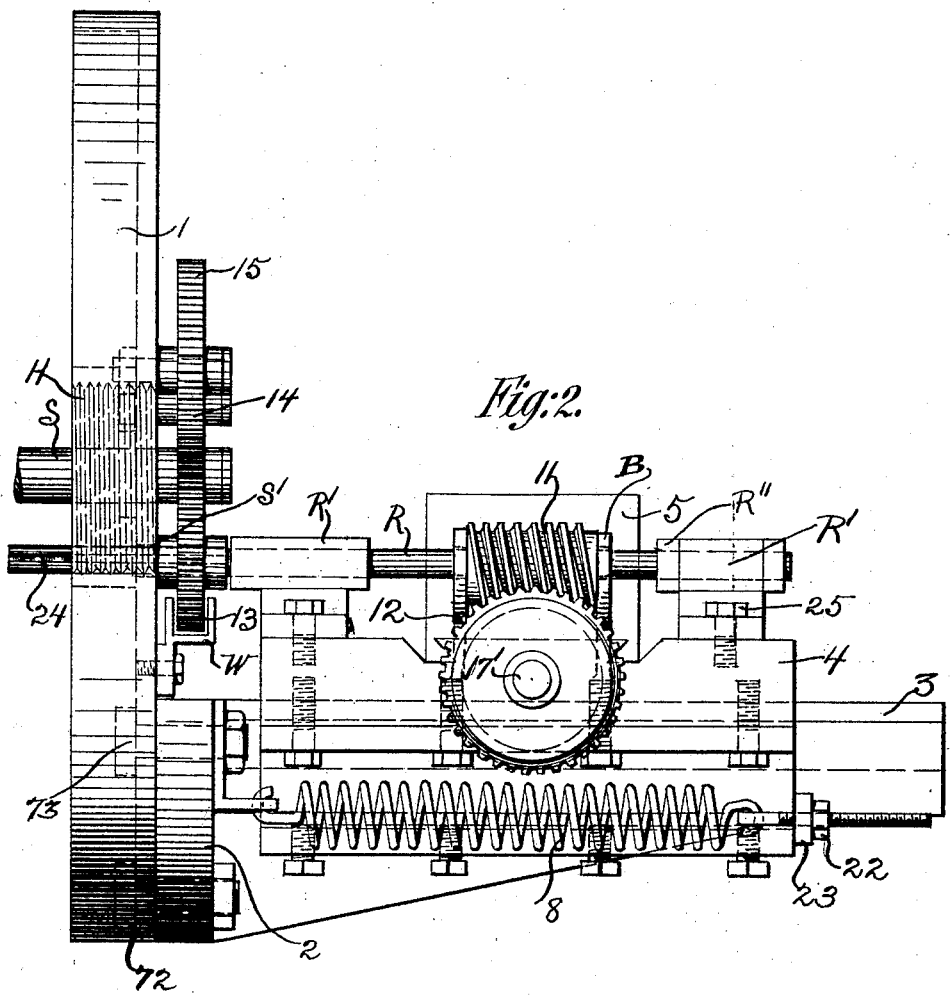

March 2, 1926.  1,575,367
R. W. JOHNSON
SHAPING MECHANISM
Filed August 6, 1923  3 Sheets-Sheet 3
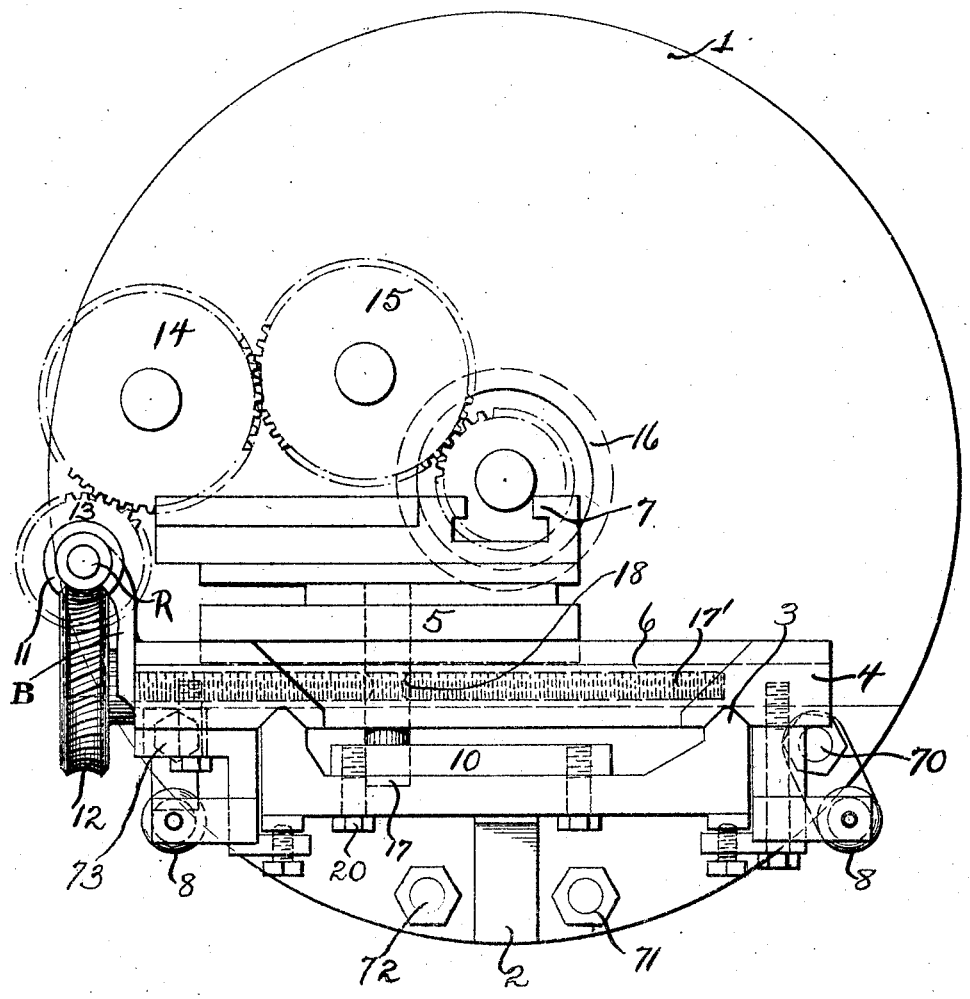
Fig: 3.
Inventor
Roy Walter Johnson
By his Attorneys
Mock & Blum Patented Mar. 2, 1926.

1,575,367

UNITED STATES PATENT OFFICE.

ROY WALTER JOHNSON, OF WINONA, MINNESOTA.

SHAPING MECHANISM.

Application filed August 6, 1923. Serial No. 656,098.

*To all whom it may concern:*

Be it known that I, ROY WALTER JOHNSON, a citizen of the United States, residing at 264 E. Fifth St., Winona, in the county of Winona and State of Minnesota, have invented certain new and useful Improvements in Shaping Mechanism, of which the following is a specification.

My invention relates to a new and improved shaping mechanism.

One of the objects of my invention is to provide a new and improved automatic mechanism for cutting or otherwise operating upon articles of various shapes.

Another object of my invention is to provide a new and improved mechanism for cutting or otherwise operating upon parabolic light reflectors, of the type used in automobiles, etc.

Another object of my invention is to produce a mechanism of this type which can be operated as an attachment to any revolving plate, such as the face plate of any suitable lathe. When the mechanism is connected to the face plate of a lathe, it may be considered as constituting a revolving secondary shaping device.

Another object of my invention is to provide a lathe mechanism in which the cutting or other tool is continuously rotated about a given axis, and is simultaneously moved in a predetermined manner in a direction parallel to said axis, the said tool being also caused to move in a direction lateral to the axis about which it is rotated so that the said tool is caused to travel on the surface of a solid of revolution. The direction of motion of the tool can be the result of any combination of said parallel and lateral directions.

Another object of my invention is to devise a mechanism of this type in which the tool can be readily caused to operate through a plurality of paths, and which will be simple and cheap to construct and operate, and which will have high operating efficiency.

Other objects of my invention will be set forth in the following description and drawings, which illustrate a preferred embodiment thereof.

Fig. 1 is a plan view with certain of the parts removed to show the structure more clearly.

Fig. 2 is a side elevation.

Fig. 3 is a front elevation.

The face plate 1 of any suitable lathe is mounted upon a hollow spindle of any known type by means of the threaded socket H. The spindle is omitted from the drawings as in itself it is old and well known.

The mechanism which may be called the "secondary shaping device", is mounted on a bracket consisting of an angle plate 2, which is connected to the face plate 1 by bolts 70, 71, 72 and 73. This angle plate 2 has V-shaped projections 3 which constitute guides upon which the main carriage 4 can be slid to and fro in a direction parallel to the spindle of the face plate 1. This direction may be called the longitudinal direction.

The main carriage 4 is provided with slides 6, and the cross-carriage 5 is mounted on said slides 6 so that it can be slid to and fro in the lateral direction.

A tool holder 7 is mounted on the tool carrier of the cross-carriage 5 in the ordinary manner.

The main carriage 4 is normally urged in a position towards the face plate 1 by means of tension springs 8. The inner ends of said springs 8 are connected to arms connected to angle plate 2 and face plate 1 by means of bolts 70 and 73. The outer ends of said springs 8 are connected to bars 21 having threaded shanks which project through brackets 23 connected to carriage 4. The positions of said bars 21 can be regulated by means of nuts 22, which co-operate with the threaded shanks of said bars 21. These springs 8 are not absolutely necessary, but they assist in producing the movement towards the face plate, which is produced by pin 17, as later described. In this embodiment, the shaping is performed while the main carriage 4 is moving towards the face plate, but it would be an equivalent to have this work performed while said carriage is moving away from said plate. When the springs 8 are used in the device, their tension is not sufficient to cause the carriage 4 to move towards the face plate against the resistance offered by the friction of the various parts.

The lateral movement of the cross-carriage 5 is produced by means of the cross-feed screw 17′ which is connected to the gear 12 and is suitably mounted in the main-carriage 4. This cross-feed screw 17′ passes through a threaded opening 18 in the pin 17 of the cross-carriage 5.

The longitudinal movement of the cross-carriage 5, and hence of the main carriage 4 is controlled by the co-operation of the pin 17 of the cross-carriage 5, with the guide slot 9 of a guide plate 10, which is connected to the angle plate 2 by means of bolts 20.

The gear 12 of the cross feed screw is revolved by means of the worm 11, mounted on and secured to the shaft R, which is mounted in suitable bearings on the main carriage 4. Said bearings are connected to said carriage 4 by bolts 25. These bearings R' have suitable collars R'' and such collars and other well-known mechanical accessories are not specifically illustrated in the drawings, as in themselves they are well-known. The carriage 4 has perforated arms or brackets B on both sides of worm 11. The shaft R can freely revolve with respect to said arms B, since it passes through the perforations in said arms B. Hence, if the carriage 5 is moved laterally and the carriage 4 is moved longitudinally, the worm 11 and the gear 12 always remain in mesh, by the action of the arms or brackets B, while the shaft R is free to slide longitudinally.

The shaft R has the gear 13 which is revolved by means of the stationary gear 16, mounted on the stationary spindle S, through the intermediate meshing gears 15 and 14 which are mounted on short shafts connected to the face plate 1. The stationary spindle S passes through the hollow spindle of the face plate and is held by any suitable device.

The shaft R passes through hub members S' of said gear 13, and it can slide longitudinally with respect to said gear 13. The gear 13 has a suitable key which fits into the keyway 24 of the shaft R. The gear 13 is prevented from moving out of engagement with gear 14 by means of a yoke W which is secured to face plate 1 by means of a suitable bolt.

The operation of my device can be illustrated in connection with the cutting of a parabolic reflector, but it could be used to cut any convex or concave surface. The guide slot 9 is, for example, so arranged that when the main carriage 4 and hence the tool holder 7 is set out from the face plate 1 to the desired distance therefrom, the cutting tool being on the axis of revolution of the face plate, so that the cutting is performed as the tool travels towards the face plate.

The face plate is then caused to revolve. Since the gear 16 remains stationary, and the shafts of gears 15, and 14 are secured to the face plate 1 and rotate therewith, this causes the cross-carriage 5 to be moved laterally so that the cutting tool is moved laterally from the axis of revolution of the face plate, which may be called the main axis. The lateral movement of the cross-carriage 5 actuates its pin 17 in the guide slot 9, so that the main carriage 4 is moved by the action of said pin and the tension of the springs 8 inwardly towards the face plate, since the slides 6 do not permit the cross-carriage 5 to move longitudinally with respect to the main carriage 4. Hence as the tool revolves in circles of gradually increasing diameter, and it is moved in a regulated path towards the face plate, and operates to cut out a paraboloid.

The blank upon which the tool operates is first preferably roughly shaped by any suitable means.

I believe and claim that I have devised a pioneer mechanism for automatically and accurately cutting out a variety of different shapes which are symmetrical with respect to an axis of revolution. I am aware that it has been proposed to connect a tool to a revolving carriage, so that the tool is held parallel to the plane of revolution of said carriage, and to cause the tool to be simultaneously rotated and moved along a straight line perpendicular to the plane of revolution of said carriage, or to be moved in a fixed straight line inclined to the axis of revolution of said carriage so as to make a short tapering cut. However, my invention enables the tool to be given a compound movement whose longitudinal movement is an arc of any desired shape. In addition, the tool held in the tool holder 7 is held parallel to the axis of revolution of the face plate so that it can be caused to operate on the outside surface or inside surface of a body, while in the said proposed device, the tool could only operate on the outside of a body. While I have shown a bed plate provided with a guide slot, and a carriage having a pin, for securing a compound movement of the tool whose longitudinal component is an arc of any desired shape, my invention is not restricted to this specific mechanical means for securing such movement, but extends to all means for producing such a movement, wherever said guide slot and pin are specified either in the description or claims.

Of course, the guide plate 10 could be readily removed and replaced by a similar plate having a different guide slot 9, so that the mechanism can be readily adapted for cutting out a variety of shapes.

I have shown a preferred embodiment of my invention but it is clear that numerous changes and omissions could be made without departing from its spirit.

I claim:—

1. A shaping mechanism comprising a revoluble member having a slidable member connected thereto, said slidable member having a second slidable member connected thereto, one of said slidable members having a tool holder connected thereto and being movable in a direction different from the direction of movement of said first slidable member, a guide plate provided with a guide slot and connected to said revoluble member, one of said slidable members having a pin fitting into and co-operating with said guide slot, and means adapted to move one of said carriages when said revoluble member is revolved, said guide slot and pin being adapted to cause said tool holder to have a movement whose longitudinal component is an arc.

2. A device according to claim 1 in which said tool holder is adapted to hold said tool in a substantially longitudinal direction.

3. A shaping mechanism comprising a revoluble face plate, a bed plate connected thereto and having a guide plate provided with a guide slot connected thereto, a movable carriage mounted on said bed plate, a second movable carriage having a tool holder and adapted to move in unison with said first carriage in one direction, said second carriage having a pin fitting into and co-operating with said guide slot, and means adapted to move said second carriage when said face plate is revolved.

4. A shaping mechanism comprising a revoluble face plate, a bed plate connected thereto and having a guide plate provided with a guide slot connected thereto, a longitudinally movable carriage mounted on said bed plate and having lateral slide means, a laterally movable carriage mounted on said lateral slide means and adapted to move longitudinally in unison with said longitudinally movable carriage, said laterally movable carriage having a pin provided with a lateral threaded opening, a cross-feed screw revolubly mounted in said longitudinally movable carriage and passing through said opening in said pin and adapted to cause the movement of said pin, said screw having a gear connected thereto, a worm mounted on a longitudinal shaft and in mesh with said gear, said longitudinal shaft having a gear adapted to be operated by the revolution of said face plate.

5. A device according to claim 5 in which said longitudinal shaft has a longitudinal keyway co-operating with a key connected to its gear, and said gear is mounted adjacent said face plate and is connected to a stationary gear mounted on the axis of said face plate by means of intermediate gears which are mounted on said face plate.

In testimony whereof I hereunto affix my signature.

ROY WALTER JOHNSON.